United States Patent
Takeuchi et al.

(10) Patent No.: US 6,616,988 B1
(45) Date of Patent: Sep. 9, 2003

(54) SULFUR CONTAINING ATOMIC GROUP INTRODUCED POROUS ARTICLE, PROCESS FOR INTRODUCING A SULFUR CONTAINING ATOMIC GROUP ONTO THE OUTER-INNER SURFACES OF A POROUS ARTICLE, AND A BATTERY SEPARATOR

(75) Inventors: Yasushi Takeuchi, Ibaraki (JP); Masaaki Kawabe, Ibaraki (JP); Hiroaki Yamazaki, Ibaraki (JP); Masashi Kaneko, Ibaraki (JP); Genya Anan, Ibaraki (JP); Kazuya Sato, Ibaraki (JP)

(73) Assignee: Japan Vilene Company, Ltd., Tokyo (JP)

( * ) Notice: Subject to any disclaimer, the term of this patent is extended or adjusted under 35 U.S.C. 154(b) by 0 days.

(21) Appl. No.: 09/694,446

(22) Filed: Oct. 23, 2000

Related U.S. Application Data

(62) Division of application No. 09/255,661, filed on Feb. 22, 1999, now Pat. No. 6,171,708.

(30) Foreign Application Priority Data

Feb. 23, 1998 (JP) ............................................ 10-057498

(51) Int. Cl.[7] .................................................. H05H 1/46
(52) U.S. Cl. ...................... 427/596; 427/535; 427/538
(58) Field of Search ................................ 427/569, 535, 427/538

(56) References Cited

U.S. PATENT DOCUMENTS

| | | | | |
|---|---|---|---|---|
| 3,255,099 A | * | 6/1966 | Wolinski | |
| 4,765,860 A | * | 8/1988 | Ueno et al. | 427/491 |
| 4,929,319 A | * | 5/1990 | Dinter et al. | |
| 5,585,147 A | * | 12/1996 | Ogawa et al. | 427/535 |
| 5,843,789 A | * | 12/1998 | Nomura et al. | 427/488 |
| 5,895,558 A | * | 4/1999 | Spence | 427/569 |

* cited by examiner

Primary Examiner—Marianne Padgett
(74) Attorney, Agent, or Firm—Darby & Darby

(57) ABSTRACT

A porous article wherein a sulfur containing atomic group is introduced onto at least a part of outer-inner surfaces of the article, a ratio (S/C) of the number of sulfur atoms (S) to the number of carbon atoms (C) on the surface onto which the sulfur containing atomic group is introduced is $7 \times 10^{-4}$ or more, a ratio (O/C) of the number of oxygen atoms (O) to the number of carbon atoms (C) on the surface onto which the sulfur containing atomic group is introduced is 0.2 or more, and the ratio (S/C) and the ratio (O/C) are determined by means of an X-ray photoelectron spectrophotometer is disclosed.

5 Claims, 4 Drawing Sheets

(3 of 4 Drawing Sheet(s) Filed in Color)

[Fig. 1]
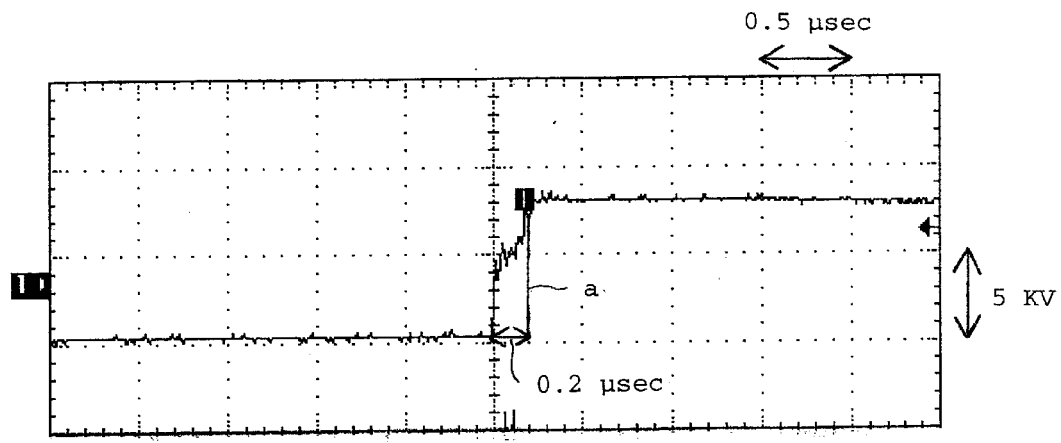
[Fig. 2]
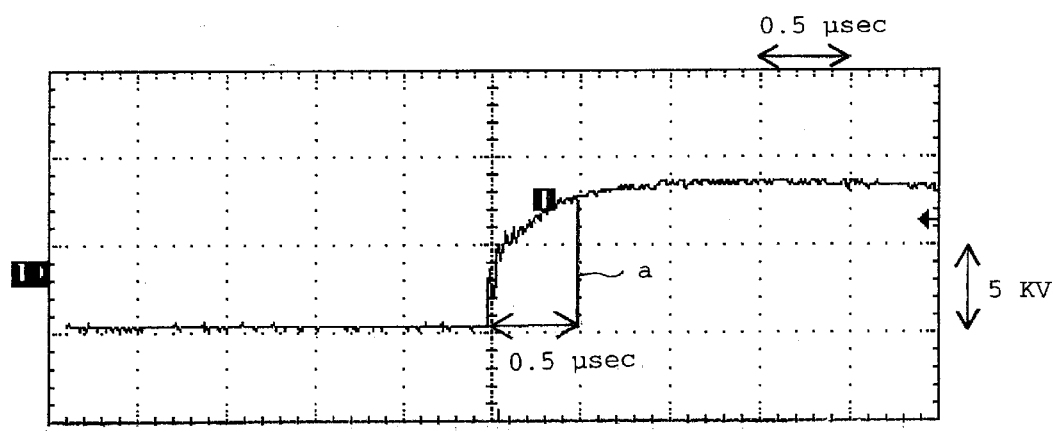
[Fig. 3]
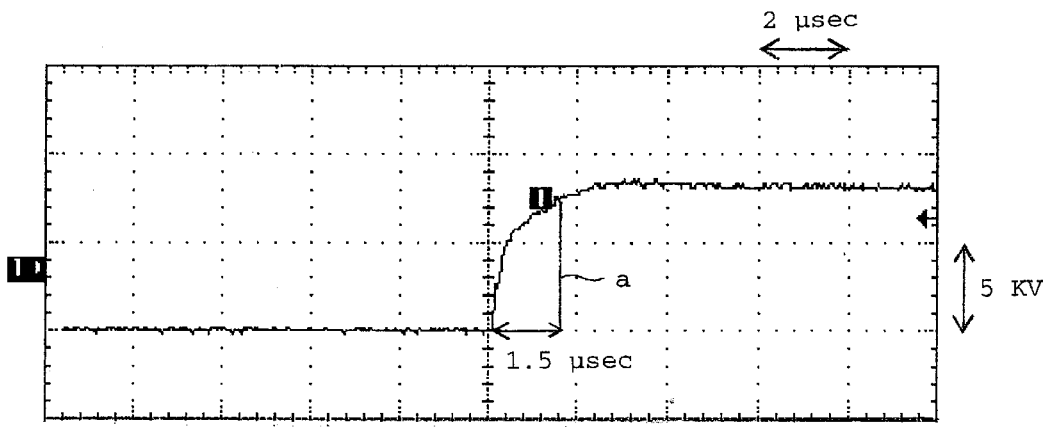

[Fig. 4]
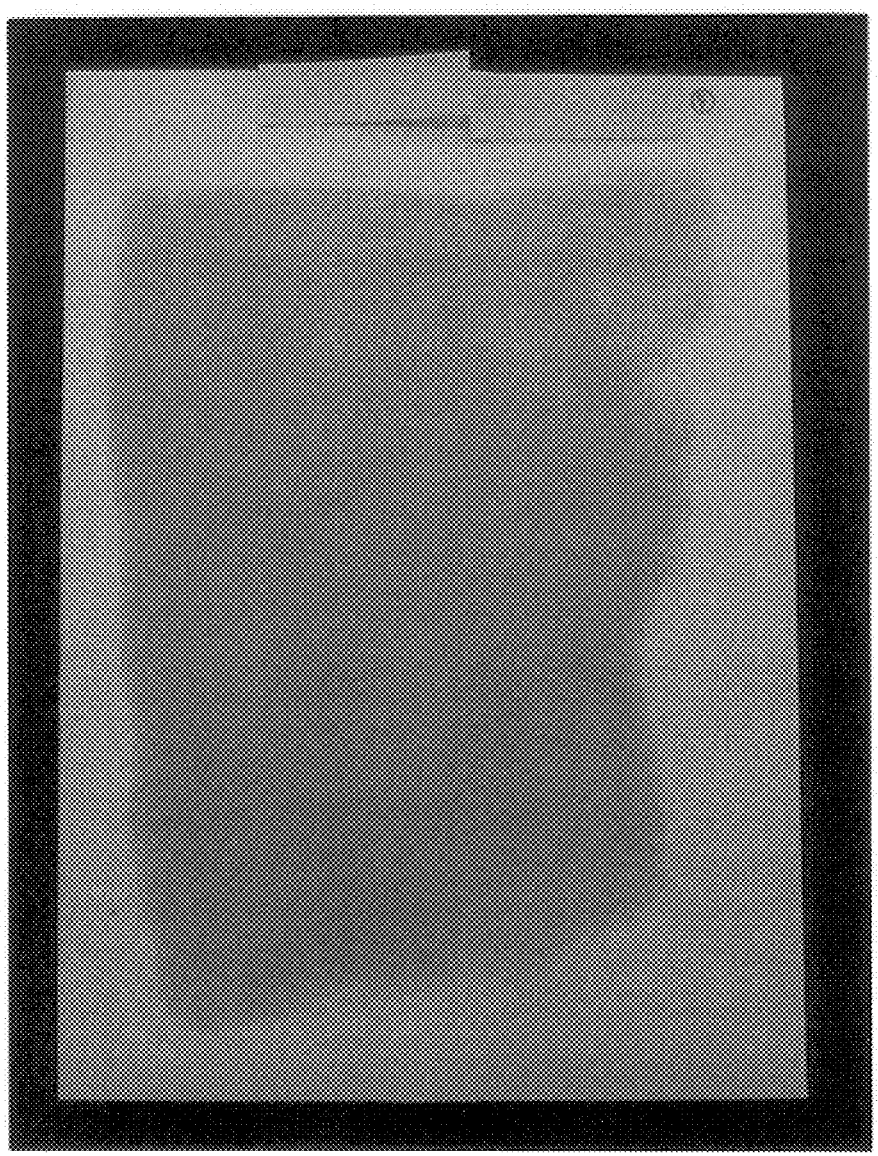

[Fig. 5]
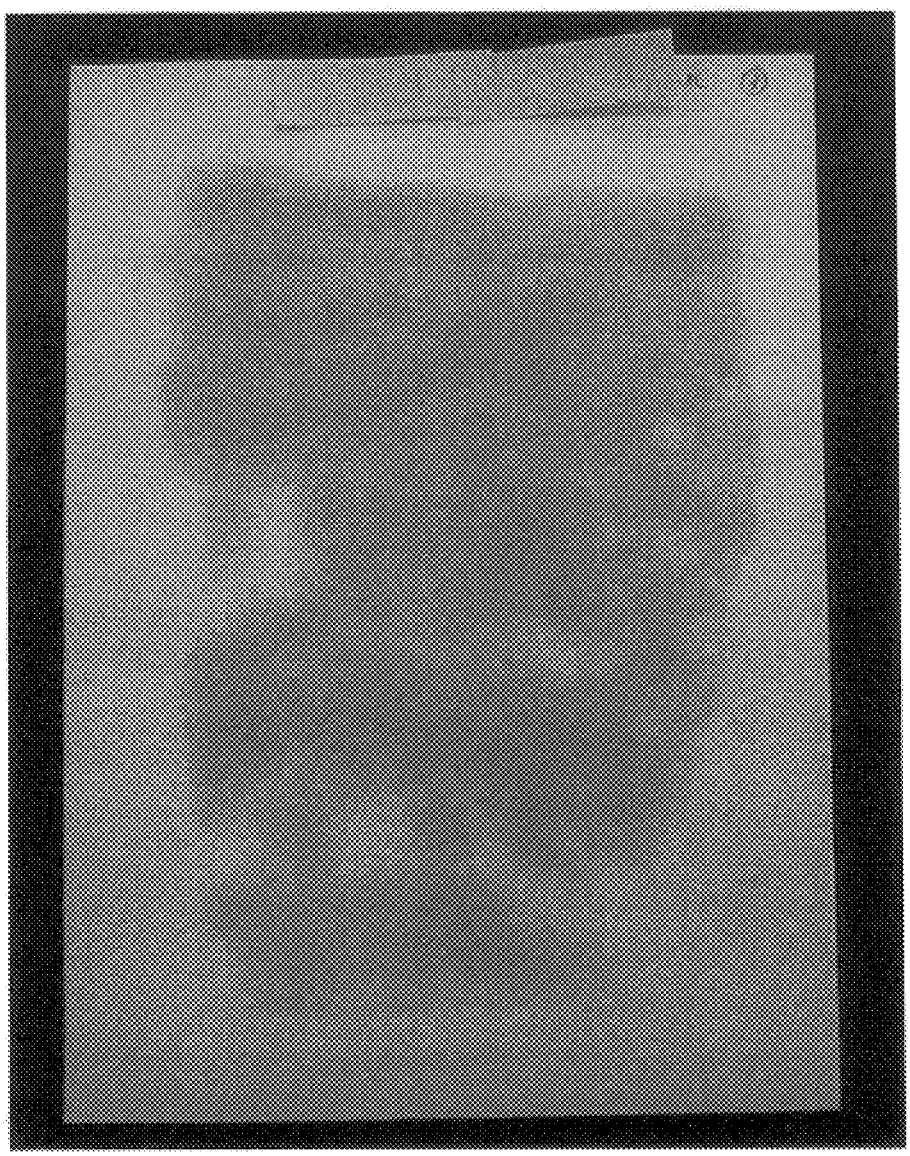

[Fig. 6]
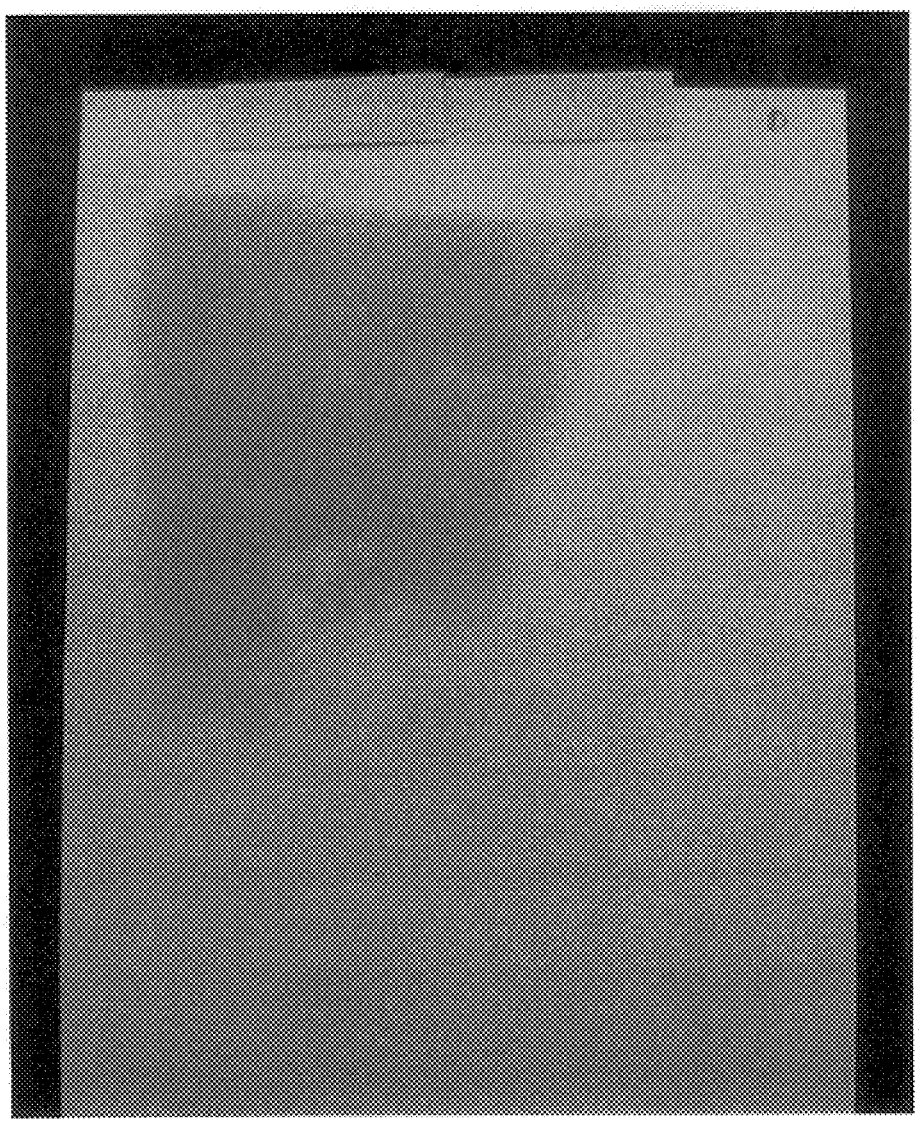

SULFUR CONTAINING ATOMIC GROUP INTRODUCED POROUS ARTICLE, PROCESS FOR INTRODUCING A SULFUR CONTAINING ATOMIC GROUP ONTO THE OUTER-INNER SURFACES OF A POROUS ARTICLE, AND A BATTERY SEPARATOR

This is a divisional of application Ser. No: 09/255,661 filed Feb. 22, 1999, now U.S. Pat. No. 6,171,708 in the name of Yasushi TAKEUCHI, et al. for A SULFUR CONTAINING ATOMIC GROUP INTRODUCED POROUS ARTICLE, PROCESS FOR INTRODUCING A SULFUR CONTAINING ATOMIC GROUP ONTO THE OUTER-INNER SURFACES OF A POROUS ARTICLE, AND A BATTERY SEPARATOR.

BACKGROUND OF THE INVENTION

1. Field of the Invention

The present invention relates to a novel porous article to which a sulfur containing atomic group is introduced, i.e., a sulfur containing atomic group introduced porous article, a process for introducing a sulfur containing atomic group onto outer-inner surfaces of a porous article, and a battery separator comprising the sulfur containing atomic group introduced porous article.

2. Description of the Related Art

Hitherto, a sulfonating treatment was known as one process for introducing a sulfur containing atomic group onto a surface of a porous article. The conventional sulfonating treatments include, for example, a treatment with a fuming sulfuric acid, or a treatment with a plasma produced by an atmospheric-pressure glow discharge in an atmosphere of a gaseous mixture of a treating gas and a rare gas. The sulfonation on the surface of the porous article, i.e., the introduction of sulfonic groups ($SO_3H$) onto the surface to be treated, can impart a hydrophilic property to the porous article or enhance a hydrophilic property of the porous article. A degree of the sulfonation on the treated porous article correlates with a ratio (S/C) of the number of sulfur atoms (S) to the number of carbon atoms (C) on the treated surface (hereinafter referred to as a surface S/C ratio). A higher degree of sulfonation correlates with a higher surface S/C ratio.

The sulfonation treatment with a fuming sulfuric acid can introduce sulfonic groups at a high degree, and a treated article having a high surface S/C ratio can be obtained. Nevertheless, the sulfonated article treated in this process tends to exhibit a lower ratio (O/C) of the number of oxygen atoms (O) to the number of carbon atoms (C) on the treated surface (hereinafter referred to as a surface O/C ratio), i.e., an index to show a degree of introduction of a carboxyl group and so on. The surface O/C ratio correlates with a wettable property, or wetting property. An article with a lower surface O/C ratio has a poor wettable property. For example, when a sulfonated material obtained in this process is used as a battery separator, a further treatment (for example, an application of a surface active agent) is required to enhance the wettable property. Further, the process using a fuming sulfuric acid requires a large-scale apparatus for washing away unreacted fuming sulfuric acid, and a large-scale treatment of a waste liquor containing a concentrated sulfuric acid. There is also a problem of a deterioration in the strength of the treated article.

The treatment with a plasma produced by an atmospheric-pressure glow discharge in an atmosphere of a gaseous mixture of a treating gas and a rare gas is disclosed in, for example, Japanese Unexamined Patent Publication (Kokai) No. 9-85026. The publication discloses a process for treating a porous article having a three-dimensional network wherein the article is placed between a pair of electrodes which are located opposite to each other, at least one of the electrodes carrying a dielectric layer on a surface facing the other electrode; and a discharged plasma treatment is conducted under an atmospheric pressure in the presence of a gaseous mixture of a treating gas and a rare gas. The publication description also states that if a concentration of the treating gas in the gaseous mixture is beyond 10% by volume of the rare gas, i.e., a concentration of the treating gas is beyond 9.09% by volume of the gaseous mixture, it becomes difficult to generate a uniformly discharged plasma upon applying a voltage, and thus the concentration of the treating gas is preferably 0.01 to 9.09% by volume of the gaseous mixture. Further, the publication mentions that a discharged plasma treatment was actually performed under a sulfur dioxide/helium mixture containing 0.5% by volume of sulfur dioxide as a treating gas, and states that sulfur dioxide, sulfur trioxide, oxygen or nitrogen can be used as the treating gas.

As apparent from the description of the above publication, it is necessary in the process for an atmospheric-pressure glow discharge to apply a voltage in the presence of more than 90% by volume of rare gas, to generate a uniformly discharged plasma. Therefore, it is impossible to increase the concentration of the treating gas in the gaseous mixture over the limitation, and thus, a sulfonated article having a high surface S/C ratio and a high surface O/C ratio at the same time was not known.

SUMMARY OF THE INVENTION

Accordingly, the object of the present invention is to provide a novel porous article or material wherein a sulfur containing atomic group is introduced and a high surface S/C ratio and a high surface O/C ratio are exhibited at the same time.

Another object of the present invention is to provide a means whereby the sulfur containing atomic group is introduced onto the outer-inner surfaces of the porous article or material to a high degree by carrying out a discharge under an atmospheric pressure, and thus, a large-scale apparatus or a large-scale treatment of a waste liquor containing a concentrated sulfuric acid is not required.

Still another object of the present invention is to provide a battery separator having a high surface S/C ratio and a high surface O/C ratio at the same time.

Other objects and advantages will be apparent from the following description.

In accordance with the present invention, there is provided a porous article wherein a sulfur containing atomic group is introduced onto at least a part of outer-inner surfaces of the porous article, a ratio (S/C) of the number of sulfur atoms (S) to the number of carbon atoms (C) on the surface onto which the sulfur containing atomic group is introduced is $7\times10^{-4}$ or more, a ratio (O/C) of the number of oxygen atoms (O) to the number of carbon atoms (C) on the surface onto which the sulfur containing atomic group is introduced is 0.2 or more, and the ratio (S/C) and the ratio (O/C) are determined by means of an X-ray photoelectron spectrophotometer.

Further, in accordance with the present invention, there is provided a battery separator comprising a non-woven fabric wherein a sulfur containing atomic group is introduced onto at least a part of outer-inner surfaces of the non-woven fabric, a ratio (S/C) of the number of sulfur atoms (S) to the number of carbon atoms (C) on the surface onto which the sulfur containing atomic group is introduced is $7 \times 10^{-4}$ or more, a ratio (O/C) of the number of oxygen atoms (O) to the number of carbon atoms (C) on the surface onto which the sulfur containing atomic group is introduced is 0.2 or more, and the ratio (S/C) and the ratio (O/C) are determined by means of an X-ray photoelectron spectrophotometer.

Further, in accordance with the present invention, there is provided a process for introducing a sulfur containing atomic group onto at least a part of outer-inner surfaces of a porous article comprising steps of:

placing the porous article between a pair of electrodes which are located opposite to each other, at least one of the electrodes carrying a dielectric layer on a surface facing the other electrode; and applying a voltage between the electrodes in the presence of 10% by volume or more of a gas of a sulfur containing compound, based on a total volume of a surface-treating gas, under an atmospheric pressure to thereby cause a discharge.

Further, in accordance with the present invention, there is provided a process for introducing a sulfur containing atomic group onto at least a part of outer-inner surfaces of a porous article, comprising steps of:

placing the porous article between a pair of electrodes which are located opposite to each other, at least one of the electrodes carrying a dielectric layer on a surface facing the other electrode; and applying a voltage between the electrodes in the presence of a gas of a sulfur containing compound and an oxygen gas under an atmospheric pressure to thereby cause a discharge.

Further, in accordance with the present invention, there is provided a process for introducing a sulfur containing atomic group onto at least a part of outer-inner surfaces of a porous article, comprising steps of:

placing the porous article between a pair of electrodes which are located opposite to each other and carry a dielectric layer on a surface facing the other electrode, respectively, so that the porous article is brought into contact with both dielectric layers without coming into contact with the electrodes; and applying a voltage between the electrodes in the presence of a gas of a sulfur containing compound under an atmospheric pressure to thereby induce an electric discharge in voids contained in the porous article and sandwiched between a pair of the electrodes.

The term "outer-inner surfaces" as used herein with reference to the porous article or material collectively indicates (i) an outer surface of the porous article or material to be treated, and (ii) an inner surface of the porous article or material to be treated. The term "outer surface" means a surface which is in contact with a hypothetical or virtual smooth surface of a hypothetical or virtual geometrical solid hypothetically circumscribing the porous article or material with the hypothetical smooth surface. The term "inner surface" means a surface of a void contained in the hypothetical or virtual geometrical solid hypothetically circumscribing the porous article or material with the hypothetical smooth surface. Namely, the inner surface of a foamed porous article or material denotes the surfaces of all cells, the inner surface of a porous film denotes the surfaces of concave portions, such as depressions or grooves, or through-holes, and the inner surface of a fabric porous article or material denotes the surfaces of the inner spaces formed by constitutional fibers, that is, the surfaces of the constitutional fibers.

The term "sulfur containing atomic group" as used herein means an atomic group which contains one or more sulfur atoms and newly introduced onto a porous article or material to be treated, by treating the porous article or material in accordance with a process of the present invention. The conditions of the sulfur containing atomic group existing in or binding to the porous article or material are not limited. The sulfur containing atomic group includes, for example, an atom, a functional group, a crosslinked group, a molecule, or the like which physically and/or chemically bonds to the porous article or material. The sulfur containing atomic group introduced onto the porous article or material treated, i.e., the sulfur containing atomic group on the sulfur containing atomic group introduced porous article or material, can be determined by means of an X-ray photoelectron spectrophotometry.

BRIEF DESCRIPTION OF DRAWINGS

FIG. 2 is a sectional view schematically illustrating an essential principle of the process according to the present invention.

FIG. 3 illustrates a shape of a repeating pulse wave which may be used in the process according to the present invention.

FIG. 4 illustrates a shape of another repeating pulse wave which may be used in the process according to the present invention.

FIG. 5 illustrates a shape of still another repeating pulse wave which may be used in the process according to the present invention.

FIG. 6 is a perspective view schematically illustrating an embodiment of the process according to the present invention.

DESCRIPTION OF THE PREFERRED EMBODIMENTS

Figure 1:
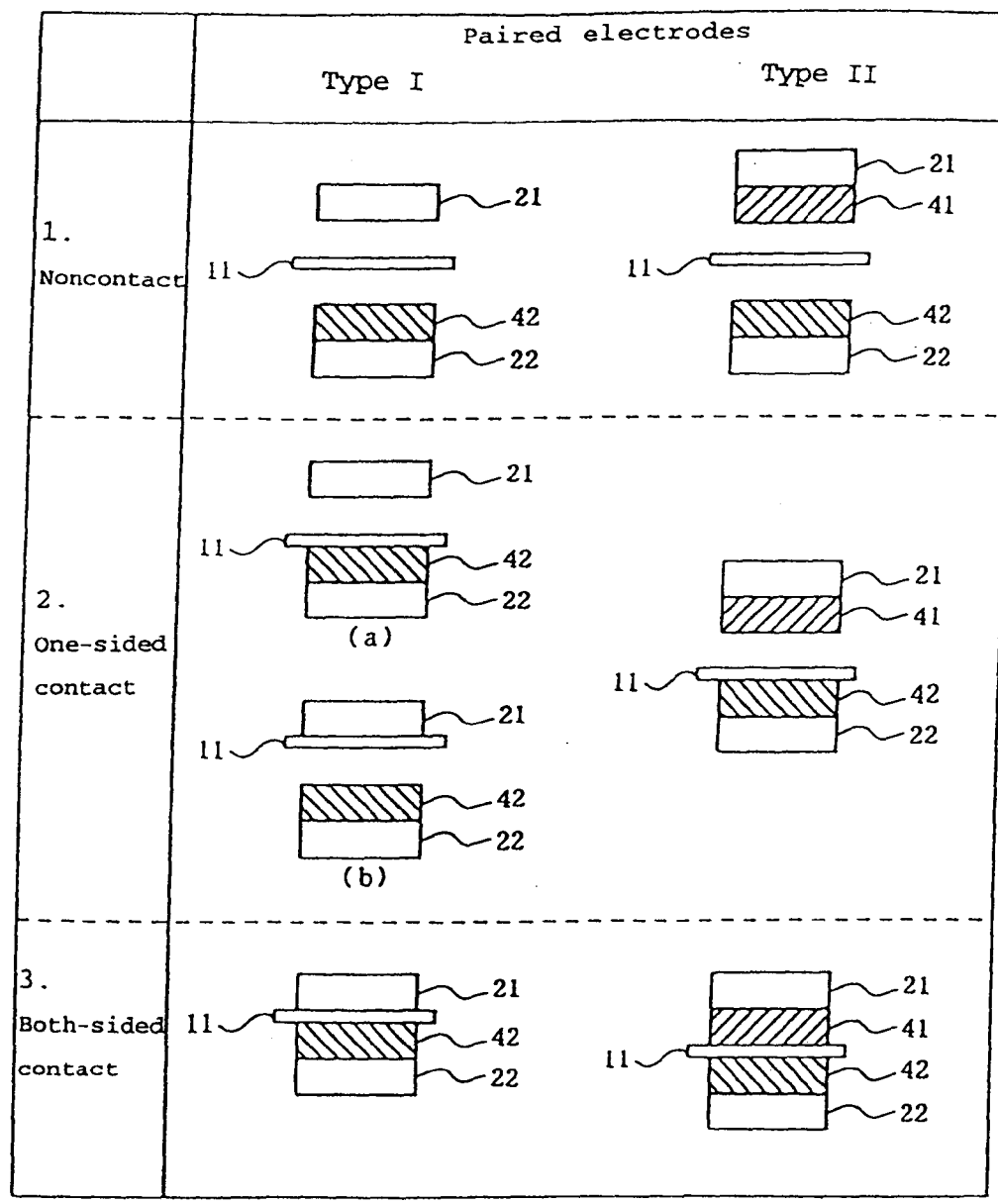
FIG. 1 illustrates various embodiments of the process according to the present invention.

In the porous article which a sulfur containing atomic group is introduced to, i.e., the sulfur containing atomic group introduced porous article, according to the present invention, the surface S/C ratio determined by means of an X-ray photoelectron spectrophotometer, i.e., the ratio (S/C) of the number of sulfur atoms (S) to the number of carbon atoms (C) on the surface onto which the sulfur containing atomic group is introduced and which is determined by means of an X-ray photoelectron spectrophotometer is $7 \times 10^{-4}$ or more, and the surface O/C ratio determined by means of an X-ray photoelectron spectrophotometer, i.e., the ratio (O/C) of the number of oxygen atoms (O) to the number of carbon atoms (C) on the surface onto which the sulfur containing atomic group is introduced and which is determined by means of an X-ray photoelectron spectrophotometer is 0.2 or more. A technique to obtain a sulfur containing atomic group introduced porous article having such a high surface S/C ratio and a high surface O/C ratio at the same time is not known in prior art, and therefore, the sulfur containing atomic group introduced porous article according to the present invention is not known in prior art.

In the sulfur containing atomic group introduced porous article according to the present invention, the surface S/C ratio is preferably $6 \times 10^{-2}$ or more, more preferably $7 \times 10^{-2}$ or more. The surface S/C ratio can reach about 0.8, using the process according to the present invention as mentioned below.

In the sulfur containing atomic group introduced porous article according to the present invention, the surface O/C ratio is preferably 0.25 or more. A surface O/C ratio in a sulfonated article obtainable by a conventional process using a fuming sulfuric acid, or a atmospheric-pressure glow discharge generally is less than 0.2. The surface O/C ratio can reach about 3, using the process according to the present invention as mentioned below.

When an S/C ratio in a whole porous article to which the =sulfur containing atomic group is introduced (hereinafter referred to as a whole S/C ratio) is $1 \times 10^{-3}$ or more, properties such as ion exchangeability, ion absorbability, ammonia absorbability, or bio-compatibility are improved because of a high sulfur content. Particularly, when a sulfur containing atomic group introduced non-woven fabric having the whole S/C ratio of $1.5 \times 10^{-3}$ or more is used as a battery separator, a property of inhibiting a self-discharge is improved. When a sulfur containing atomic group introduced non-woven fabric having the whole S/C ratio of $2 \times 10^{-3}$ or more is used as a battery separator, a property of inhibiting a self-discharge is further improved. On the contrary, an S/C ratio in a whole sulfonated article obtainable by a conventional atmospheric-pressure glow discharge reaches less than $1 \times 10^{-3}$.

When the sulfur containing atomic group introduced porous article according to the present invention is prepared by introducing the sulfur containing atomic group to a porous article consisting essentially of an organic polymer material, particularly an organic synthetic polymer material which does not contain a substantial amount of sulfur atoms or oxygen atoms in its constitutional units, the whole S/C ratio of the treated article is 0.05 or less.

The whole S/C ratio can be determined, for example, from a sulfur content in the porous article obtained by an organic elemental analysis, or an oxygen combustion flask method, and a composition and a weight of the porous article. A carbon content may be measured by an organic elemental analysis.

In a preferred embodiment of the sulfur containing atomic group introduced porous article according to the present invention, a ratio (A/B) of the surface S/C ratio (A) determined by means of an X-ray photoelectron spectrophotometer to the whole S/C ratio (B) is 15 or more, more preferably 20 or more, most preferably 25 or more. A high ratio (A/B)., i.e., a high A/B ratio, of the surface S/C ratio (A) to the whole S/C ratio (B) shows a tendency for the sulfur containing atomic groups to localize on the surfaces of the materials constituting the porous article. Namely, the high A/B ratio means that the sulfur containing atomic groups is not introduced deeply into the inner part of the materials constituting the porous article, and that the treated porous article, i.e., the sulfur containing atomic group introduced porous article, has an excellent strength. On the contrary, a conventional sulfonation using a fuming sulfuric acid results in a deep introduction of the sulfur containing atomic groups into the inner part of the materials constituting the porous article, and thus, the strength of the sulfonated article, i.e., the sulfur containing atomic group introduced porous article, is reduced. A treated porous article having the A/B ratio of up to about 100 can be obtained in accordance with the process of the present invention, as described below. The surface S/C ratio can be determined by means of X-ray photoelectron spectrophotometry, for example, by measuring peak areas of carbon atoms and sulfur atoms on the surface examined, and making a correction of a photo-ionization cross section. The surface O/C ratio can also be determined by means of X-ray photoelectron spectrophotometry, for example, by measuring peak areas of carbon atoms and oxygen atoms on the surface to be examined, and making a correction of a photo-ionization cross section. The porous article is washed before the analysis to remove substances such as a surface active agent existing on the surface examined and affecting the surface S/C ratio and the surface O/C ratio.

The sulfur containing atomic group introduced porous article according to the present invention can be identified by detecting a treatment to impart a hydrophilic property (i.e., a hydrophilic treatment), and then measuring the surface S/C ratio and the surface O/C ratio in the treated surface of the porous article to which the hydrophilic treatment is detected to be applied. For example, the identification by detecting the hydrophilic treatment on the basis of a wetting index is shown as follows:

(1) Some parts of a given porous sample are analyzed by infrared spectroscopy to identify constitutional material not belonging to the outer-inner surfaces of the sample. The portion not belonging to the outer-inner surfaces may be, for example, a solid portion in the film porous article or a foamed porous article, or an inner portion of a constitutional fiber in the fibrous porous article. A wetting index of a sample composed of the identified material is determined from a "wetting test of polyethylene and polypropylene film" (JIS K $6768^{-1977}$). When a plurality of the identified materials exist, a wetting index of the material having a lower index is used. Further, an indicating agent capable of wetting and coloring the material having the determined index is selected.

(2) The sample is dipped in a solution of the selected indicating agent containing a coloring agent, and taken out therefrom. Then, the surface of the sample belongs to one of the following cases (a) to (c):

(a) The surface contains a colored portion (untreated portion) and a non-colored portion. The non-colored portion means that a hydrophobic treatment (i.e., a treatment for imparting a hydrophobic property) has been conducted. The result shows that the sample has not encountered any hydrophilic treatment.

(b) The sample is not colored at all. This result means that a hydrophobic treatment has been conducted to the whole sample, and thus, the sample has not encountered any hydrophilic treatment.

(c) The whole sample is colored. This result means that a hydrophilic treatment has been conducted to the whole sample or a part thereof, or no treatment has been conducted to the whole sample. In this case, the sample is further analyzed in step (3) as follows.

(3) The sample is dipped in a solution of an indicating agent having a wetting index higher than that of the indicating agent used in the above step (2), and then taken out therefrom. It is preferable to use an indicating agent having a wetting index slightly higher than that of the indicating agent used in the above step (2), and then repeating the above procedure, successively using indicating agents having gradually increasing wetting indexes. The surface of the sample belongs to one of the following cases (d) to (f):

(d) The whole sample is not colored, when the indicating agent having a wetting index slightly higher than that of the indicating agent used in the above step (2) is used. This result means that no treatment has been conducted to the whole sample.

(e) The surface contains a non-colored portion (untreated portion) and a colored portion, when the indicating agent having a wetting index slightly higher than that of the indicating agent used in the above step (2) is used. This result means that a hydrophilic treatment has been conducted to the colored portion. In this case, the sample is further analyzed in step (4) as follows.

(f) When the indicating agents having gradually increasing wetting indexes are used, the whole sample is colored with all indicating agents having up to a certain level of wetting indexes, but the whole sample is not colored with an indicating agent having a wetting index slightly higher than the above-mentioned level. This result means that a hydrophilic treatment has been conducted to the whole sample. In this case, the sample is further analyzed in step (4) as follows.

The above steps (1) to (3) can reveal whether or not a hydrophilic treatment has been conducted. When a hydrophilic treatment is detected, a surface S/C ratio and a surface O/C ratio on the treated surface (i.e., the surface on which the hydrophilic treatment has been conducted) are determined to identify whether or not the sample belongs to the sulfur containing atomic group introduced porous article according to the present invention.

(4) A surface SIC ratio and a surface O/C ratio on the treated surface are determined by means of the X-ray photoelectron spectrophotometer. When the sample has the surface S/C ratio of $7 \times 10^{-4}$ or more, and at the same time the surface O/C ratio of 0.2 or more, it is the sulfur containing atomic group introduced porous article according to the present invention.

The sulfur containing atomic group introduced porous article according to the present invention may be prepared by introducing the sulfur containing atomic group onto a porous article, using one of various processes found by the inventors of the present invention.

In the process for introducing the sulfur containing atomic group, a discharge is caused in the presence of a gaseous sulfur containing compound. The sulfur containing compound includes, for example, a sulfur oxide or hydrogen sulfide ($H_2S$). As the sulfur oxide there may be mentioned, for example, sulfur monoxide (SO), sulfur dioxide ($SO_2$), sulfur trioxide ($SO_3$), disulfur trioxide ($S_2O_3$), or sulfur heptoxide ($S_2O_7$). In the process of the present invention, the sulfur containing compound can be used alone or in combination thereof. It is preferable to use a sulfur oxide of the formula:

$$SO_x$$

wherein x is an integer of 1 to 3, but sulfur dioxide ($SO_2$) being more preferable, because a discharge can be stably caused.

The process for introducing the sulfur containing atomic group according to the present invention may be carried out in the presence or absence of a rare gas. In the process of the present invention, it is not necessary to use a rare gas as a discharge can be stably caused in the absence of a rare gas, whereas a conventional atmospheric-pressure glow discharge requires a rare gas to stably cause a discharge. The term "rare gas" as used herein means an element belonging to the group 0 in the periodic table, specifically, six elements, that is, helium, neon, argon, krypton, xenon, and radon.

In the presence of the sulfur containing compound gas and under an atmospheric pressure, the process of the present invention can be carried out either in an open system, i.e., generally in the presence of air, or in a closed system, i.e., in an airtight vessel under an atmospheric pressure.

In one embodiment of the process for introducing the sulfur containing atomic group according to the present invention, a discharge can be caused in the presence of, preferably 10% by volume or more, more preferably 20 to 90% by volume, most preferably 25 to 80% by volume of the sulfur containing compound gas, based on a total volume of a surface-treating gas as mentioned below. If the concentration of the sulfur containing compound gas is less than 10% by volume, based on a total volume of a surface-treating gas, an introducing efficiency may be lowered, or a desirable effect of such an introduction may not be obtained.

In another embodiment of the process for introducing the sulfur containing atomic group according to the present invention, a discharge can be caused in the presence of the sulfur containing compound gas together with a diluting gas other than the sulfur containing compound gas, for example, air, nitrogen, oxygen or a rare gas, or a mixture thereof (for example, a mixture of a rare gas and oxygen), preferably in the presence of the sulfur containing compound gas and oxygen, more preferably, in the presence of the sulfur containing compound gas and oxygen only (i.e., without a substantial amount of other gas). The mixture of the sulfur containing compound gas for introducing the sulfur containing atomic group and the diluting gas is sometimes herein referred to as a surface-treating gas. The concentration of the diluting gas is not particularly limited, but can be appropriately determined, if the concentration of the sulfur containing compound gas is within an appropriate range. When a discharge is caused in the presence of the sulfur containing compound gas and oxygen, the concentration of the sulfur containing compound gas is preferably 10% by volume or more, more preferably 20 to 90% by volume, most preferably 25 to 80% by volume, based on a total volume of the surface-treating gas. When a discharge is caused in the presence of only the sulfur containing compound gas and oxygen (i.e., in the absence of a gas other than the sulfur containing compound gas and oxygen), the concentration of the sulfur containing compound gas is preferably 10% by volume or more, more preferably 20 to 90% by volume, most preferably 25 to 80% by volume, based on a total volume of a surface-treating gas.

In the process for introducing the sulfur containing atomic group according to the present invention, a porous article to be treated is placed between a pair of electrodes. The electrodes are located opposite to each other, and at least one of the electrodes carries a dielectric layer on a surface facing the other electrode. The paired electrodes used in the process of the present invention can be (I) one embodiment wherein one electrode carries a dielectric layer on a surface facing the other electrode, and the other electrode does not carry a dielectric layer (hereinafter referred to as type 1 paired electrodes); or (II) another embodiment wherein both electrodes carry a dielectric layer on a surface facing the other electrode (hereinafter referred to as type 2 paired electrodes).

When the porous article to be treated is placed between the paired electrodes, the surfaces of the porous article may be in contact with or separated from the surfaces of the electrodes or the dielectric layers. More particularly, the ways of arranging the paired electrodes and the porous article to be treated are as follows:

(1) one arrangement wherein the porous article to be treated is not in contact with the paired electrodes or the dielectric layers [hereinafter referred to as a noncontact arrangement];

(2) another arrangement wherein the outer surface on one side of the porous article to be treated is in contact with one of the paired electrodes (in contact with the surface of the electrode not carrying a dielectric layer, or a dielectric layer on the electrode carrying the dielectric layer), while the outer surface on the other side of the porous article to be treated is not in contact with the other electrode (not in contact with the surface of the electrode not carrying a dielectric layer, or a dielectric layer on the electrode carrying the dielectric layer) [hereinafter referred to as a one-sided contact arrangement]; and (3) still another arrangement wherein the outer surfaces on both sides of the porous article to be treated are in contact with both of the paired electrodes (in contact with the surface of the electrode not carrying a dielectric layer, or a dielectric layer on the electrode carrying the dielectric layer) [hereinafter referred to as a both-sided contact arrangement].

FIG. 1 schematically illustrates the arrangement manners produced by combining the paired electrodes (I) and (II), and the arrangements (1)–(3).

For example, in the type I paired electrodes/noncontact arrangement (I-1), as shown in FIG. 1, the porous article 11 is placed between a pair of electrodes 21, 22 which are located opposite to each other, while the porous article 11 does not come into contact with the paired electrodes 21, 22. The electrode 21 does not carry a dielectric layer, but the electrode 22 does carry a dielectric layer 42.

In the type II paired electrodes/noncontact arrangement (II-1), the porous article 11 is placed between a pair of electrodes 21, 22 which are located opposite to each other, and carry the dielectric layers 41, 42, respectively, while the porous article 11 does not come into contact with the paired electrodes 21, 22 nor the dielectric layers 41, 42.

In the type I paired electrodes/one-sided contact arrangement (I-2), the porous article 11 is also placed between a pair of electrodes 21, 22 which are located opposite to each other, and the electrode 21 does not carry a dielectric layer, but the electrode 22 does carry a dielectric layer 42. In this arrangement, the porous article 11 is placed in such a manner that (a) the outer surface on one side of the porous article 11 comes into contact with the dielectric layer 42 on the electrode 22 without coming in contact with the electrode 22, while the outer surface on the other side of the porous article 11 does not come in contact with the electrode 21, or (b) the outer surface on one side of the porous article 11 comes in contact with the electrode 21, while the outer surface on the other side of the porous article 11 does not come in contact with the dielectric layer 42 on the electrode 22 (also does not come in contact with the electrode 22).

In the type II paired electrodes/one-sided contact arrangement (II-2), the porous article 11 is also placed between a pair of electrodes 21, 22 which are located opposite to each other and carry the dielectric layers 41, 42, respectively, in such a manner that the outer surface on one side of the porous article 11 comes in contact with one dielectric layer (the dielectric layer 42 in FIG. 1), while the outer surface on the other side of the porous article 11 does not come in contact with the other dielectric layer (the dielectric layer 41 in FIG. 1), and the porous article 11 does not come in contact with the electrodes 21, 22.

In the type I paired electrodes/both-sided contact arrangement (I-3), the porous article 11 is also placed between a pair of electrodes 21, 22 which are located opposite to each other, and the electrode 21 does not carry a dielectric layer, but the electrode 22 does carry a dielectric layer 42. In this arrangement, the porous article 11 is placed in such a manner that the outer surface on one side of the porous article 11 comes in contact with the dielectric layer 42 on the electrode 22 without coming in contact with the electrode 22, and the outer surface on the other side of the porous article 11 comes in contact with the electrode 21.

In the type II paired electrodes/both-sided contact arrangement (II-3), the porous article 11 is also placed between a pair of electrodes 21, 22 which are located opposite to each other and carry the dielectric layers 41, 42, respectively, in such a manner that the outer surfaces of both sides of the porous article 11 come in contact with both dielectric layers 41, 42 on the electrodes 21, 22 without coming in contact with the electrodes 21, 22.

In the process for introducing the sulfur containing atomic group according to the present invention, it is preferable to use the type II paired electrodes and arrange the porous article to be treated, the electrodes, and the dielectric layers as described, because a discharge can be thus uniformly caused.

The process for introducing the sulfur containing atomic group according to the present invention will be described hereinafter, with reference to the drawings.

An essential principle of the process for introducing the sulfur containing atomic group according to the present invention is shown in FIG. 2. Although the principle will be described, referring to the type II paired electrodes/both-sided contact arrangement (II-3) as shown in FIG. 2, the following description can be applied to the other arrangements (for example, the type I or II paired electrodes/noncontact, the type I or II paired electrodes/one-sided contact., or the type I paired electrodes/both-sided contact arrangements), unless otherwise indicated.

In the type II paired electrodes/both-sided contact arrangement as shown in FIG. 2, a pair of electrodes (such as plane electrodes) 21, 22 are located opposite to each other. The electrode 21 carries a dielectric layer 41 fixed on a surface facing the other electrode 22, and the electrode 22 carries a dielectric layer 42 fixed on a surface facing the other electrode 21. The porous article 11 is placed between the dielectric layers 41, 42 so that the outer surfaces of both sides of the porous article 11 are brought into direct contact with the dielectric layers 41, 42, respectively, without coming into contact with the electrodes 21, 22. The electrodes 21, 22 are subjected to a suitable pressure, to thereby ensure that no substantial spaces are formed between the dielectric layer 41 and the porous article 11, and the porous article 11 and the dielectric layer 42, respectively. Alternatively, an electrode carrying a unfixed dielectric layer can be used instead of the electrode carrying a fixed dielectric layer. In this case, the electrodes 21, 22 are subjected to a suitable pressure, to thereby ensure that no substantial spaces are formed between the electrode 21 and the dielectric layer 41, the dielectric layer 41 and the porous article 11, the porous article 11 and the dielectric layer 42, the dielectric layer 42 and the electrode 22, respectively. The lower limit of the pressure applied to the electrodes is a pressure needed to ensure the contact of the electrodes and the dielectric layers, and the contact of the dielectric layers and the porous article so that the spaces are not formed therebetween. Further, the upper limit of the pressure is a pressure that will not destroy the porous article.

Each of the electrodes 21, 22 is preferably smaller in size than each of the dielectric layers 41, 42 in contact with them, as this prevents the occurrence of a spark between the edges of the electrodes 21, 22. When each of the electrodes 21, 22 is the same size as each of the dielectric layers 41, 42 in contact with them, a spark between the electrodes 21, 22 may be prevented by providing a dielectric cover, such as a vinyl tape, around the edges of the electrodes. The electrode 21 is connected to an AC supply 51, and the electrode 22 is grounded. FIG. 2 shows an embodiment wherein the electrode 21 is connected to an AC supply 51, and the electrode 22 is grounded, but the electrode 22 may be connected to an AC supply 51, and the electrode 21 may be grounded.

When a high AC sinusoidal voltage is applied from the AC supply 51 in the presence of the sulfur containing compound gas, a discharge occurs in the inner voids of the porous article 11, to thereby generate a plasma. Under the action of the plasma formed in the inner voids of the porous article 11, the inner surfaces of the porous article 11 are reacted with the sulfur containing compound, and thus the inner surfaces of the porous article 11 are modified, that is, the sulfur containing compounds (such as $SO_4$, $SO_3H$) are introduced.

When the voltage is applied, the outer surfaces of the porous article 11 are brought into close contact with the dielectric layers 41, 42, and theoretically, the plasma formed in the inner voids of the porous article 11 does not act on the points at which the outer surfaces are in contact with the dielectric layers 41, 42. Nevertheless, such points of contact actually account for very narrow areas in comparison with the outer-inner surfaces, and therefore, it is considered that substantially all of the outer surfaces are treated. Further, the porous article 11 is treated not only with the plasma but also with sulfuric anhydrides produced by the action of the plasma. When the porous article 11 is separated from the dielectric layers 41, 42, the points of contact are treated with the sulfuric anhydrides produced by the action of the plasma. In the type II paired electrodes/both-sided contact arrangement, the discharge occurs in the inner voids of the porous article 11, and thus little damage to the porous article 11 occurs due to a spark discharge or the like.

As described, in the type II paired electrodes/both-sided contact arrangement as shown in FIG. 2, a discharge occurs in the inner voids of the porous article 11, to thereby generate a plasma, when a voltage is applied between the electrodes 21, 22. In the type I paired electrodes/both-sided contact arrangement, a discharge also occurs in the inner voids of the porous article 11 to thereby generate a plasma, when a voltage is applied between the electrodes. In the type I or II paired electrodes/noncontact, and the type I or II paired electrodes/one-sided contact arrangements, a discharge occurs in a space or spaces between the porous article 11 and the electrode or electrodes or the dielectric layer or layers, and in the inner voids of the porous article 11 to thereby generate a plasma, when a voltage is applied between the electrodes 21, 22.

As described in the embodiment as shown in FIG. 2, a high AC sinusoidal voltage may be applied between the electrodes 21, 22. In the process for introducing the sulfur containing atomic group according to the present invention, the voltage which may be applied between the electrodes 21, 22 to cause the discharge is not particularly limited, so long as it is a voltage having a value varying with time, preferably a voltage exhibiting a continuous or intermittent wave-shape repeatedly increasing and decreasing with a substantially constant period. The voltage may be, for example, an AC sinusoidal voltage, or repeating pulse voltage. The wave-shape of the voltage applied is not particularly limited but, for example, is a sinusoidal wave, a triangular wave, a rectangular wave, or the like. The polarity of the voltage applied is not particularly limited. It is possible to use a monopolar voltage or a bi-polar voltage, but the bi-polar voltage is preferable, because of a high efficiency of the treatment thus obtained.

As the repeating pulse wave, there may be mentioned, for example, a bi-polar pulse wave as shown in FIG. 3, a monopolar pulse wave as shown in FIG. 4, a bi-polar rectangular repeating pulse wave as shown FIG. 5, or the like.

In these repeating pulse waves, the voltage wave rising time, i.e., the time period wherein the voltage reaches 90% of a first peak voltage from a reference voltage, for example, "t" as shown in FIGS. 3 to 5, is preferably 1 microsecond or less, more preferably 0.2 microsecond or less. A preferable range of a frequency of the repeating pulse wave, for example, a frequency defined from a cycle composed of the wave-length $\lambda$ as shown in FIGS. 3 to 5, is not particularly limited, but the upper limit is preferably 100 KHz, more preferably 50 KHz, and the lower limit is preferably 10 Hz, more preferably 50 Hz, most preferably 100 Hz.

The repeating pulse voltage may be generated, for example, by instantaneously connecting a voltage stored in a condenser to a load through a spark switch, or increasing a pulse voltage modulated by a semiconductor switch, through a transformer.

The rising time of the repeating pulse wave can be shortened, for example, by lowering a resistance or inductance to the load. Alternatively, use of a magnetic switch makes it possible to shorten the wave-length and at the same time to shorten the rising time.

A duration time of a current pulse is preferably 1 microsecond or less, to ensure a low possibility of a generation of a spark discharge.

When the repeating pulse voltage is used to generate a discharge in the process for introducing the sulfur containing atomic group according to the present invention, the repeating pulse voltage varies with the distance between the electrodes or the dielectric layers, or the concentration of gases, and thus, there is no particular lower limit imposed for the repeating pulse voltage. Nevertheless, the repeating pulse voltage is preferably 0.5 KVp or more, more preferably 2 KVp or more. The term "KVp" means a voltage difference between a maximum peak and 0 of a voltage. If the voltage is less than 0.5 KVp, a desirable discharge cannot be substantially obtained, or a uniform discharge, if generated, cannot be obtained. There is no upper limit imposed for the repeating pulse voltage applied, as long as the voltage applied does not result in damage to the porous article and the dielectric layers. Nevertheless, the repeating pulse is preferably 100 KVp or less, more preferably 50 KVp or less. If the voltage is more than 100 KVp, a dielectric breakdown is liable to occur, or it becomes difficult to increase the frequency of the pulse wave. The electric field strength is preferably 10 to 200 KVp/cm, more preferably 20 to 100 KVp/cm.

When the repeating pulse wave as above is used in the process for introducing the sulfur containing atomic group according to the present invention, it is possible to treat the outer-inner surfaces of even a porous article such as a melt-blown non-woven fabric in which a spark discharge is liable to bore holes, without boring holes. Further, when the repeating pulse wave as above is used, a uniform discharge can be stably generated, even in the presence of a high concentration (for example, 10% by volume or more) of the gaseous sulfur containing compounds, under which the conventional atmospheric-pressure glow discharge cannot be conducted.

The conditions as described as above concerning the voltages applied to generate a discharge vary considerably with the shapes of the electrodes, the materials of the porous article, the wave-shape of the discharge voltage and a treating time, and therefore, the voltage actually applied may be out of the above ranges.

In the type I or II paired electrodes/noncontact, the type I or II paired electrodes/one-sided contact, or the type I paired electrodes/both-sided contact arrangements, the voltage applied between the electrodes to generate a discharge is preferably a repeating pulse voltage having a short rising time, more preferably a repeating pulse voltage having a rising time of 1 microsecond or less. In the type I or II paired electrodes/noncontact, or the type I or II paired electrodes/one-sided contact arrangements, a pulse voltage is preferably used to generate a uniform discharge.

In the type II paired electrodes/both-sided contact arrangement, a normal AC sinusoidal voltage or a repeating pulse voltage may be used, but a repeating pulse voltage having a short rising time is preferably used to ensure a uniform treatment.

When the AC sinusoidal voltage is used to generate a discharge in the process for introducing the sulfur containing atomic group according to the present invention, the AC sinusoidal voltage varies with the distance between the electrodes or the dielectric layers, or the concentration of gases, and thus, there is no particular lower limit imposed for the AC sinusoidal voltage. Nevertheless, the AC sinusoidal voltage is preferably 0.5 KVp or more, more preferably 2 KVp or more. If the voltage is less than 0.5 KVp, a desirable discharge cannot be substantially obtained, or a uniform discharge, if generated, cannot be obtained. There is no upper limit imposed for the AC sinusoidal voltage applied, as long as the voltage applied does not result in damage to the porous article and the dielectric layers. Nevertheless, the AC sinusoidal is preferably 100 KVp or less, more preferably 50 KVp or less. If the voltage is more than 100 KVp, a dielectric breakdown is liable to occur. The electric field strength is preferably 10 to 200 KVp/cm, more preferably 20 to 100 KVp/cm.

In the process for introducing the sulfur containing atomic group according to the present invention, there is no particular upper limit of the frequency of the AC sinusoidal voltage, but the frequency is preferably 100 KHz or less, more preferably 50 KHz or less. If the frequency is more than 100 KHz, the porous article and the dielectric layers may be overheated by a dielectric heating and thus destroyed. When the frequency is 50 KHz or less, the porous article, the dielectric layers, and the electrodes do not become hot, and a stable treatment of the porous article can be successfully carried out for a long time.

A lower limit of the frequency is preferably 10 Hz, more preferably 50 Hz. If the frequency is less than 10 Hz, a treatment efficiency by the discharge may be lowered. When the frequency is 50 Hz or more, the treatment efficiency can be successfully improved, and the treatment time can be shortened.

In the process for introducing the sulfur containing atomic group according to the present invention, the AC sinusoidal power applied to generate the discharge varies with the shape of the electrodes, the materials of the dielectric layers or porous article, or the thickness thereof, and thus there is no particular limit thereon. Nevertheless, the AC sinusoidal power is preferably 0.01 to 5 W/cm², when the porous article is treated while it is really sandwiched between a pair of the electrodes in the type II paired electrodes/both-sided contact arrangement, as shown in FIG. 2.

When the porous article is linearly sandwiched between a pair of the cylindrical electrodes, as shown in FIG. 6, the AC sinusoidal power is preferably 0.1 to 9 W/cm, more preferably 0.1 to 6 W/cm. When the porous article is linearly sandwiched using a plurality of electrodes, the figures as set forth for the AC sinusoidal power mean a power per electrode.

In the type II paired electrodes/both-sided contact arrangement, if the AC sinusoidal power is less than the above-mentioned scope, i.e., less than 0.01 W/cm² when the porous article is linearly sandwiched, or less than 0.1 W/cm when the porous article is linearly sandwiched, a discharge may mainly occur only at portions where the discharge is easily induced, and thus the outer-inner surfaces may not be uniformly treated. If the AC sinusoidal power is greater than the above-mentioned scope, i.e., more than 5 W/cm² when the porous article is really sandwiched, or more than 9 W/cm when the porous article is linearly sandwiched, pores may be formed in the porous article by an arc discharge.

In the process for introducing the sulfur containing atomic groups according to the present invention, a highly efficient treatment and a uniform discharge can be obtained without a spark discharge, when a peak current density (J; mA/cm²) and a voltage rising time (T; nanosecond) satisfy the equations (1):

$$(150 \times t) \times 150 \leq J \leq (1100/T)^2 \times 200 \qquad (1),$$

where a voltage rising time (T) is not more than 150 nanosecond (ns), or the equations (2):

$$150 \leq J \leq (1100/T)^2 \times 200 \qquad (2),$$

where a voltage rising time (T) is more than 150 nanosecond (ns).

The peak current density is a quotient of division of a peak value of a discharge current by an area of the dielectric.

The material of the electrodes which may be used in the process for introducing the sulfur containing atomic group according to the present invention may be an electrically conductive material having a specific electric resistance of preferably $10^3$ Ω·cm or less, more preferably $10^0$ Ω·cm or less, for example, a metal, such as stainless steel, aluminum or tungsten, or an electrically conductive metal oxide, carbon, or an electrically conductive composite rubber of an electrical conductor (such as powdered metal or powdered carbon) and rubber.

The shape of the electrodes may be, for example, a sheet, plate or cylinder. When the porous article is moved relative to the electrodes as shown in FIG. 6, a cylindrical electrode rotatable synchronously with the parallel movement of the porous article around the central axis of the electrode is preferable, whereby little damage to the surface of the porous article will occur.

The dielectric layer which may be used in the process for introducing the sulfur containing atomic group according to the present invention may be non-porous as a whole, or may contain a porous portion. If a dielectric layer used is porous as a whole, a spark discharge may occur in the porous voids of the porous article and the dielectric layer. Therefore, the use of such a dielectric layer in the present invention is not preferable. Further, it is not preferable to use a dielectric layer containing a porous portion therethrough in the direction of the thickness, for the same reason.

When the dielectric layer used contains a porous portion on the surface which is to be in contact with the porous article to be treated, the contacting portions of the dielectric layer and the porous article are reduced in comparison with the case where the dielectric layer used is non-porous as a whole, and thus the outer surfaces of the porous article can be more effectively treated.

Dielectric materials which may be used for the dielectric layer in the process for introducing the sulfur containing atomic group according to the present invention may be, for example, glass, ceramic (such as alumina, titanium oxide, zirconia, strontium titanate, barium titanate), rubber (such as synthetic rubber, such as silicone rubber, chloroprene rubber, butadiene rubber, or natural rubber), or thermoplastic resin (such as polytetrafluoroethylene, polyethylene, polypropylene, or polyester). It is preferable to use the dielectric layer containing rubber or a thermoplastic resin material having a high elasticity, in the portion, particularly the surface, which is to come into contact with the porous article. It is more preferable to use the dielectric layer containing rubber having a high elasticity and close contacting properties. Further, it is preferable to use rubber which will cause very little damage to the surface of the porous article to be treated, or polytetrafluoroethylene which is resistant to dielectric breakdown. It is particularly preferable to use glass, ceramic, or polytetrafluoroethylene from the viewpoint of durability.

The thickness of the dielectric layer is not particularly limited but is preferably 0.01 to 20 mm, more preferable 0.1 to 10 mm. If the thickness is more than 20 mm, the voltage required to generate a discharge may become too high. If the thickness is less than 0.01 mm, the mechanical strength of the dielectric layer may be lowered, and a dielectric breakdown may easily occur.

In the process for introducing the sulfur containing atomic group according to the present invention, a distance between the porous article to be treated and the dielectric layer (where the electrode carries the dielectric layer), or the electrode (where it does not carry the dielectric layer) is not particularly limited, but preferably is 0 mm (i.e., a contacting state) to 100 mm. If the distance is more than 100 mm, the voltage necessary to generate a discharge becomes too high, and holes may be formed in the porous article.

In the process for introducing the sulfur containing atomic group according to the present invention, the surface-treating gas can be supplied into the inner voids of the porous article and/or a space between the porous article and the electrodes or the dielectric layers by, for example, forcibly inserting the gas into the insides of the porous article, spraying the gas directly against or around the porous article, providing a gaseous atmosphere around the porous article, or filling the inner voids with the gas before placing the porous article between the electrodes. The supplement of the gas as above may be carried out alone or in combination thereof, in an open or closed system. It is preferable to fill the inner voids with the surface-treating gas, for example, by passing the surface-treating gas through the inner voids of the porous article, before the porous article is placed between the electrodes. In the type I or II paired electrodes/ noncontact or the type I or II paired electrodes/one-sided contact arrangements, the surface-treating gas can thoroughly diffuse, and thus, a uniform treatment with a discharge can be carried out.

When a high voltage is applied to generate a discharge while the surface-treating gas is supplied into the inner voids of the porous article and/or around the porous article from, for example, a gas-supplying pipe or the like, the sulfur containing compound gas included in the surface-treating gas is reacted with the outer-inner surfaces of the porous article by the action of the plasma generated in the inner voids of the porous article and/or the space between the porous article and the electrodes or the dielectric layers, whereby the outer-inner surfaces of the porous article can be modified, that is, the sulfur containing atomic group can be introduced.

In the process for introducing the sulfur containing atomic group according to the present invention, it is preferable to adhere a surface-active agent to the porous article and then treat the article with a discharge. The pre-treatment with the surface-active agent exhibits a tendency to increase the amount of sulfur containing atomic group introduced. The surface-active agent which may be used is, for example, a hydrocarbon, silicone, or fluorine surface-active agent.

In the pre-treatment, the surface-active agent can be carried on the surface of the porous article by, for example, dissolving or suspending the surface-active agent in a suitable solvent or medium, impregnating the porous article with the solution or suspension, or spraying the solution or suspension onto the porous article, or coating the solution or suspension onto the porous article, and then removing only the solvent or medium.

The process for introducing the sulfur containing atomic group according to the present invention is not limited to the embodiment as shown in FIG. 2, wherein the porous article is treated under a static condition to generate the discharge. In the process of the present invention, the porous article can be continuously treated while the porous article is moved. When the above embodiment is used, the electrodes, the dielectric layers and the porous article may be arranged, but not limited to, preferably in the type II paired electrodes/ noncontact arrangement (II-1) or the type II paired electrodes/one-sided contact arrangement (II-2). The continuously treating embodiment is shown in FIG. 6. Although the embodiment will be described, referring to the type II paired electrodes/both-sided contact arrangement (II-3) as shown in FIG. 6, the following description can be applied to the other arrangements (for example, the type I or II paired electrodes/noncontact, the type I or II paired electrodes/one-sided contact, or the type I paired electrodes/both-sided contact arrangements), unless otherwise indicated.

In this embodiment, cylindrical electrodes 21, 22 are located opposite to each other, and the surfaces of the cylindrical electrodes 21, 22 are covered with dielectric layers 41, 42, respectively. The cylindrical electrodes 21, 22 may be rotatable around their axes, respectively, or nonrotatably fixed. The preferable cylindrical electrode is rotatable around its axis, as this produces very little damage to the surface of the porous article.

The electrode 21 is connected to the AC supply 51, and the electrode 22 is grounded. The porous article 11 is continuously supplied at a predetermined rate in the direction of the arrow A between the dielectric layers 41, 42 which are carried on the surfaces of the electrodes 21, 22, by a conveying means, such as a pair of delivery rolls (not shown), disposed upstream of the electrodes 21, 22. The porous article 11 is passed through the dielectric layers 41, 42 while brought into contact therewith. Thereafter, the porous article 11 is continuously conveyed at a predetermined rate by a conveying means, such as a pair of delivery rolls (not shown), disposed downstream of the electrodes 21, 22. A driving means, such as a motor, to supplement a driving force needed to convey the porous article 11 may be connected with the above-mentioned delivery roll and/or the rotatable electrode.

The rate of supplying and conveying the porous article 11 is not particularly limited, but may be constant, or periodically or irregularly changed. The rate of supplying and conveying the porous article 11 is preferably a constant rate such that the surface treatment time of the porous article is 0.1 second or more. If the rate of supplying and conveying the porous article 11 is higher, the treatment of the outer-inner surfaces may be insufficient.

When the porous article 11 is passed through the dielectric layers 41, 42, while brought into contact therewith, a high AC voltage is applied from the AC supply 51, while supplying the surface-treating gas from nozzles 63, 65 provided on a side wall of each of a gas-supplying pipes 61, 64 to the parts to be treated, whereby a discharge is generated in the inner voids of the porous article 11 sandwiched between the contacting portions of the dielectric layers 41, 42, and the plasma is produced. The gas-supplying pipe 61 is connected with a gas cylinder (not shown) via a tube 62. The gas-supplying pipe 64 is similarly connected with the same or different gas cylinder (not shown). The inner surfaces of the porous article 11 are modified, that is, the sulfur containing atomic group is introduced, by the action of the plasma produced in the voids thereof. The plasma produced in the voids in the porous article 11 does not act on the contacting portions of the dielectric layers 41, 42 and the porous article 11. Nevertheless, the porous article 11 is continuously conveyed at a predetermined rate, and therefore, the outer surfaces thereof which have been the contacting portions are successively separated from the dielectric layers 41, 42, and immediately after the separation, the outer surfaces of the porous article 11 are reacted with sulfuric anhydrides produced by the action of the plasma, and modified.

The porous article 11 is continuously conveyed at a predetermined rate. Therefore, the untreated article 11 is continuously supplied between the dielectric layers 41, 42, and at the same time, the treated article 11 is continuously provided from the dielectric layers 41, 42, whereby the outer-inner surfaces of the porous article 11 may be continuously treated. In the embodiments as shown in FIG. 2, the porous article can be continuously conveyed to thereby continuously carry out the treatment, by providing a conveying means, such as a pair of delivery rolls as described above.

In the embodiment as shown in FIG. 6, one cylindrical electrode 21 covered with the dielectric layer 41 is disposed. The number of electrodes 21 is not particularly limited, and one or more electrodes 21 may be disposed. It is preferable to dispose a plurality of electrodes covered with the dielectric layer so that any portion of the outer surfaces of the porous article can be brought into contact with the dielectric layers on the electrodes a plurality of times, whereby the treatment effect and rate may be increased.

In the process for introducing the sulfur containing atomic group according to the present invention, a porous article made of any organic material can be treated on the outer-inner surfaces.

The porous article to be treated may be a porous article made of an organic material having any whole and surface S/C ratios and any surface O/C ratio. The porous article to be treated is made of, preferably a material having the surface S/C ratio of less than $7 \times 10^{-4}$ and the surface O/C ratio of less than 0.2, more preferably a material having the surface S/C ratio of less than $7 \times 10^{-4}$, the surface O/C ratio of less than 0.2 and the whole S/C ratio of less than $1 \times 10^{-3}$. It is more preferable to use a porous article of an organic material (particularly, an organic synthetic polymer material) not containing a substantial amount of sulfur atoms or oxygen atoms.

The organic material may be any organic polymer material, particularly any organic synthetic polymer material, for example, polyolefin, such as polyethylene orzpolypropylene, polyester, polycarbonate, polyvinyl chloride, fluorinated ethylene propylene copolymer (FEP), polyvinylidene fluoride (PVDF), vinylidene fluoride-trifluoroethylene copolymer.

The organic material (particularly organic synthetic polymer material) not containing sulfur atoms or oxygen atoms is, for example, polyolefin, such as polypropylene, polyethylene, or polymethylpentene, polyvinyl chloride, polyvinylidene chloride, polyacrylonitrile, polytetrafluoroethylene (PTFE), polystyrene, or polyimide.

The porous article made of this material may be, for example, a fibrous porous article, film porous article, or foamed porous article. The fibrous porous article may be, for example, a woven fabric, knitted fabric, or non-woven fabric. The non-woven fabric may be, for example, a drylaid non-woven fabric, such as hydro-entangled, needle-punched, binder-bonded, fusion-bonded non-woven fabric, spun-bonded non-woven fabric, or melt-blown non-woven fabric, wetlaid non-woven fabric or a combination thereof. The foamed porous article may be, for example, an open-cell foam made of polyolefin, polyester or polyurethane resin. The film porous article may be, for example, a film having a concave structure, or a film having holes.

The process for introducing the sulfur containing atomic group according to the present invention may be applied particularly to the treatment of the fibrous porous article made of an electrically-non-conductive organic material (particularly, an organic synthetic polymer material), for example, a non-woven fabric sheet, particularly a non-woven fabric sheet which may be used as a separator for a battery, particularly, an alkaline battery. The non-woven fabric which may be used as the separator for the battery is not particularly limited, but may be, for example, a non-woven fabric which contains at least polyolefin fibers, i.e., polyethylene, ethylene-based copolymer, polypropylene, propylene-based copolymer, polybutene, butene-based copolymer, polymethylpentene, or pentene-based copolymer, as a resin component, and prepared, for example, by hydro-entangling, fusion-bonding, or melt-blowing or a combination thereof. The non-woven fabric used as the separator for the battery preferably consists essentially of polyolefin fibers in view of alkali resistance.

The battery separator of the present invention has a high surface S/C ratio and a high surface O/C ratio at the same time, exhibits an excellent liquid-holding property both in an initial stage and during a long-term performance, and an excellent wetting property, and may be used as a primary or secondary battery separator, particularly, as an alkaline primary or secondary battery separator. There may be mentioned as the alkaline primary battery, for example, an alkaline-manganese battery, a mercury battery, a silver oxide battery, an air battery, or the like. There may be mentioned as the alkaline secondary battery, for example, a nickel-cadmium battery, silver-zinc battery, silver-cadmium battery, a nickel-zinc battery, nickel-hydrogen battery, or the like.

EXAMPLES

The present invention will now be further illustrated by, but is by no means limited to, the following Examples.

Example 1

As an article to be treated, a non-woven fabric was prepared by forming a wet-laid fiber web of polyethylene/polypropylene 17 dividable fibers, hydro-entangling the fiber web, and heat-fusing the hydro-entangled web with polyethylene ultrafine fibers.

The process for introducing the sulfur containing atomic group was carried out in the type II paired electrodes/one-sided contact arrangement (II-2).

As the electrode, a plane stainless steel electrode (150 mm×210 mm) was used, and as the dielectric layer, a polytetrafluoroethylene (PTFE) membrane (thickness=0.1 mm) was used. The non-woven fabric to be treated was placed between two electrodes carrying the PTFE membranes so that one side of the non-woven fabric came into contact with the PTFE membrane on one electrode, and the other side of the non-woven fabric was spaced 0.5 mm apart from the PTFE membrane on the other electrode. A pulse voltage having a wave shape as shown in FIG. 5 (voltage= 6.8 KVp, peak current=400 A, frequency=75 Hz, rising time=0.1 microsecond) was applied to the electrodes to generate a discharge. The treatment was carried out for 10 minutes in a closed chamber at atmospheric pressure wherein air had been removed to 0.1 Torr and then a gas mixture of sulfur dioxide (SO2) and air (1:1) had been charged.

The surface S/C ratio and the surface O/C ratio of the treated non-woven fabric were obtained by an X-ray photoelectron spectrophotometer (JPS-9000MX; Nihon Denshi; excitation source=Mg-Kα, power=10 KV-10 mA). The whole S/C ratio of the treated non-woven fabric was obtained an ion chromatography. The surface and whole S/C ratios and the surface O/C ratio obtained are listed in Table 1. The kinds of the atomic groups introduced into the non-woven fabric were analyzed by the X-ray photoelectron spectrophotometer. The analysis revealed that the atomic groups introduced were mainly $SO_4$, $SO_3H$, COOH, OH, and CO.

A droplet of water was dropped on the treated non-woven fabric. The droplet was absorbed into the non-woven fabric within 0.5 second, whereas it took more than 3 seconds for the non-woven fabric treated in Comparative Example 1 as shown below to absorb a droplet of water dropped thereon.

Comparative Example 1

The non-woven fabric as prepared in Example 1 was treated with a fuming sulfuric acid (concentration=15%) at 60 °C. for 2 minutes. The treated non-woven fabric was analyzed as in Example 1. The surface and whole S/C ratios and the surface O/C ratio obtained are listed in Table 1. The atomic groups introduced were mainly $SO_4$, and $SO_3H$.

TABLE 1

|  | X-ray photoelectron spectrophotometer | | Ion chromatography |
| --- | --- | --- | --- |
|  | Surface S/C ratio | Surface O/C ratio | Whole S/C ratio |
| Example 1 | 0.160 | 0.486 | $2.5 \times 10^{-3}$ |
| Comparative Example 1 | 0.030 | 0.169 | $2.2 \times 10^{-3}$ |

Examples 2 to 10

Some experiments were carried out by changing the gas present in the discharging treatment.
(1) The Article to be Treated and the Treating Conditions As an article to be treated, a non-woven fabric (thickness= 0.25 mm) was prepared by forming a wet-laid fiber web of polyethylene/polypropylene 17 dividable fibers, hydroentangling the fiber web, and heat-fusing the hydroentangled web with polyethylene ultrafine fibers.

The process for introducing the sulfur containing atomic group was carried out in the type II paired electrodes/one-sided contact arrangement (II-2).

As the electrode, a plane stainless steel electrode (150 mm×210 mm) was used, and as the dielectric layer, a polytetrafluoroethylene (PTFE) membrane (thickness=0.26 mm) was used. The non-woven fabric to be treated was placed between two electrodes which carry the PTFE membranes on the surfaces facing each other, so that one side of the non-woven fabric came into contact with the PTFE membrane on one electrode, and the other side of the non-woven fabric was spaced 0.5 mm apart from the PTFE membrane on the other electrode. A pulse voltage having a wave shape as shown in FIG. 5 (voltage=10 KVp, peak current density=440 $mA/cm^2$, frequency=125 Hz, rising time=200 nanosecond) was applied.
(2) Treating Procedure The treating procedure will be specifically described.

The electrodes and the non-woven fabric to be treated were placed in a vacuum desiccator, and then the pressure in the desiccator was reduced by a rotary pump. The atmosphere in the desiccator was substituted with a gas mixture as shown in Table 2 by means of a gas mixer three times, and then, the gas mixture as shown in Table 2 was introduced into the desiccator by means of a gas mixer to 1 atmospheric pressure. The pulse voltage was applied for 5 minutes to carry out the discharge treatment. Thereafter, the gas mixture was removed from the desiccator, and air was introduced. The treated non-woven fabric was taken out, washed with water and air-dried.

Comparative Example 2

The procedure as in Examples 2 to 10was repeated except that 6.5% by volume-$SO_2$/93.5% by volume-He gas was used as the gas present in the discharge treatment.

Comparative Example 3

The procedure as in Examples 2 to 10 was repeated except that after the discharge treatment was conducted in 100% He gas, the atmosphere in the desiccator was substituted with oxygen gas, the non-woven fabric was allowed to stand for 15 minutes in the desiccator, 6.5% by volume-$SO_2$/93.5%-He gas was introduced into the desiccator to 1 atmospheric pressure, and then the non-woven fabric was allowed to stand for 5 minutes in the desiccator.

Comparative Example 4

The non-woven fabric as prepared in Examples 2 to 10 was treated. The non-woven fabric was dipped into a bath of a fuming sulfuric acid (concentration=15%) at 60° C. for 2 minutes, and then a corona discharge was carried out at power of 1500 W for 60 seconds (loaded energy per unit area=10.24 $J/cm^2$).

Evaluation
(1) The Whole S/C Ratio of the Treated Non-woven Fabric

The whole S/C ratio of the treated non-woven fabric was measured as follows:

$NaHCO_3$ (84 mg) was dissolved in pure water (100 ml), and a 30% $H_2O_2$ aqueous solution (1 ml) was added to prepare an absorption liquor. The absorption liquor (5 ml) was poured into a 500 ml flask for combustion (FHO-A, Hamada-Rika), and the inner wall of the flask was thoroughly wetted with the absorption liquor.

A sample (about 20 mg) was taken from the treated non-woven fabric and precisely weighed. The sample was wrapped with an ash-free filter paper and placed in a platinum basket in the flask. Then, the inside of the flask was filled with oxygen gas. The sample was burned by supplying electricity to the platinum basket. After the sample was completely burned, the flask was thoroughly shaken and then allowed to stand for 10 minutes. Pure water (10 ml) was added to a water supplying port of the flask. The inside wall of the flask was thoroughly washed with the added pure water, and the flask was allowed to stand for several minutes.

The absorption liquor in the flask was diluted with pure water to 50 ml using a graduated flask to prepare a test liquor.

The concentration of $SO_4^{2-}$ in the test liquor was measured by an ion chromatography (DIONEX, 2000i/SP). An $SO_4^{2-}$ standard liquor was used to make a correction.

The whole S/C ratio was calculated from the equation:

$$\text{Whole S/C ratio} = [(50 \times a \times 10^{-6})/b]/[(3/c) \times W] = 7.3 \times 10^{-6} \times a/W$$

wherein W is a mass (g) of the sample, a is a concentration (mg/ml) of $SO_4^{2-}$, b is a molecular weight of $SO_4^{2-}$, that is, 96, and c is a molecular weight of $C_3H_6$, that is, 42.

The samples used in Examples 2 to 10 and Comparative Examples 2 to 4 were made of polyolefin, and the number of carbon atoms was calculated on the assumption that the sample would consist only of $C_3H_6$. The results are shown in Table 2.

(2) The Surface S/C Ratio and the Surface O/C Ratio

The ratios were measured, using an X-ray photoelectron spectrophotometer (JPS-9010MX; Nihon Denshi) under the following conditions:

A sample was taken from the treated non-woven fabric, washed with pure water, dried and then fixed on a sample holder. An excitation source was Mg–Kα, a voltage applied was 10 KV, a beam current was 10 mA, and a take-off angle of photoelectrons was 90°. A peak area of carbon atoms ($C_{1s}$), a peak area of sulfur atoms ($2P_{3/2}$) and a peak area of oxygen atoms ($O_{1s}$) on the examined surface were measured, respectively, a correction of a photo-ionization cross section was made, and the surface S/C ratio and the surface O/C ratio were calculated. The results are shown in Table 3.

(3) The Rate of Maintaining a Battery Capacity

A paste nickel positive electrode (width=33 mm; length=182 mm) of a foamed nickel matrix, and a paste metal hydride alloy negative electrode (mesh metal alloy; width=33 mm; length=247 mm) were prepared as current collectors. Sample pieces (width=33 mm; length–410 mm) were taken from the sulfonated non-woven fabrics prepared in Examples 2, 3, 5, 7, and 10, and Comparative Examples 2 and 3, and sandwiched between the positive and negative electrodes. Then, the whole was spirally rolled to form SC type batteries. The batteries were placed into a housing vessel, 5N potassium hydroxide and 1N lithium hydroxide were poured into the housing vessel, and then the housing vessel was sealed to form a cylindrical nickel-hydrogen battery (capacity=2000 to 2100 mAh). The resulting battery was activated by carrying out a charge-discharge cycle of charging the battery in a constant temperature bath at 20° C. at a charging rate of 0.1 C for 12 hours (120% charging) and discharging at a discharging rate of 0.1 C to a terminal voltage of 1 V, 5 times.

Thereafter, the battery was charged in a constant temperature bath at 20° C. at a charging rate of 0.1 C for 12 hours (120% charging) and discharged at a discharging rate of 0.1 C to a terminal voltage of 1 V, to measure an initial capacity (A). Then, the battery was charged in a constant temperature bath at 20° C. at a charging rate of 0.1 C for 12 hours (120% charging) and then allowed to stand in a constant temperature bath at 65° C. for 5 days. The battery was then discharged in a constant temperature bath at 20° C. at a discharging rate of 0.1 C to a terminal voltage of 1 V, to measure a residual capacity (B). From the above results, the rate of maintaining a battery capacity (C) was calculated from the equation:

$$C(\%) = (B/A) \times 100$$

The results are shown in Table 3. As apparent from Tables 2 and 3, the battery exhibits an excellent rate of maintaining a battery capacity, when the whole S/C ratio is not less than 2.

TABLE 2

| | Treatment conditions | | | |
|---|---|---|---|---|
| | Gas (Vol %) | Frequency (Hz) | Voltage (KV) | Treating time (min) | Whole S/C ratio ($\times 10^{-3}$) |
| Example 2 | 60%-$SO_2$/40%-$O_2$ | 125 | 10 | 5 | 3.32 |
| Example 3 | 71%-$SO_2$/29%-$O_2$ | 125 | 10 | 5 | 3.74 |
| Example 4 | 80%-$SO_2$/20%-$O_2$ | 125 | 10 | 5 | 4.49 |
| Example 5 | 30%-$SO_2$/70%-Air | 125 | 10 | 5 | 1.8 |
| Example 6 | 59%-$SO_2$/41%-Air | 125 | 10 | 5 | 3.88 |
| Example 7 | 70%-$SO_2$/30%-Air | 125 | 10 | 5 | 3.07 |
| Example 8 | 40%-$SO_2$/60%-$N_2$ | 125 | 10 | 5 | 2.3 |
| Example 9 | 60%-$SO_2$/40%-$N_2$ | 125 | 10 | 5 | 3.1 |
| Example 10 | 100%-$SO_2$ | 125 | 10 | 5 | 5.21 |
| Comparative Example 2 | 6.5%-$SO_2$/93.5%-He | 125 | 10 | 5 | 0.263 |
| Comparative Example 3 | 100%-He | 125 | 10 | 5 | 0 |
| Comparative Example 4 | — | — | — | — | 2.95 |

TABLE 3

| | Determination by X-ray photoelectron spectrophotometer | | Rate of maintaining a battery capacity (%) |
|---|---|---|---|
| | Surface S/C ratio ($\times 10^{-3}$) | Surface O/C ratio ($\times 10^{-3}$) | |
| Example 2 | 104.5 | 266.3 | 54.6 |
| Example 3 | 177.0 | 309.3 | 53.3 |
| Example 4 | 213.6 | 495.8 | — |
| Example 5 | 71.0 | 285.0 | 43.2 |
| Example 6 | 93.9 | 336.1 | — |
| Example 7 | 153.2 | 425.6 | 52.8 |
| Example 8 | 94.9 | 264.4 | — |
| Example 9 | 88.0 | 291.2 | — |
| Example 10 | 141.8 | 342.3 | 53.8 |
| Comparative Example 2 | 59.4 | 190.2 | <10 |
| Comparative Example 3 | 17.6 | 144.9 | <10 |
| Comparative Example 4 | 20.1 | 102 | — |

As described above, the sulfur containing atomic group introduced porous article according to the present invention has a high surface S/C ratio and a high surface O/C ratio at the same time. Therefore, a high hydrophilic property is newly imparted or an existing hydrophilic property is considerably enhanced. The durability of the hydrophilic property is also excellent. Further, an ion adsorbability, ammonia absorbability, or bio-compatibility are newly imparted, or are improved.

According to the process for introducing the sulfur containing atomic group of the present invention, the sulfur containing atomic group can be introduced onto the outer-inner surfaces of the porous article at a high degree by generating a discharge under an atmospheric pressure, and a large-scale apparatus or a large-scale treatment of a waste liquor containing a concentrated sulfuric acid is not required. The sulfur containing atomic group is introduced mainly to the surfaces of the porous article, and very little deterioration of the porous article in strength is observed. Further, the novel sulfur containing atomic group introduced porous article having a high surface S/C ratio and a high surface O/C ratio at the same time can be obtained.

The battery separator of the present invention has a high surface S/C ratio and a high surface O/C ratio at the same time, and thus exhibits various excellent properties. For example, the battery separator of the present invention shows an excellent wettablity. Further, a high hydrophilic property at an initial stage and for a long-term performance is newly imparted or an existing hydrophilic property is considerably enhanced. The durability of the hydrophilic property, and the anti-oxidation property are also excellent, and thus a long life time is a obtained. The battery separator of the present invention has an excellent rate of maintaining the capacity, and a property of inhibiting a self-discharge is improved.

Although the present invention has been described with reference to specific embodiments, various changes and modifications obvious to those skilled in the art are deemed to be within the spirit, scope, and concept of the invention.

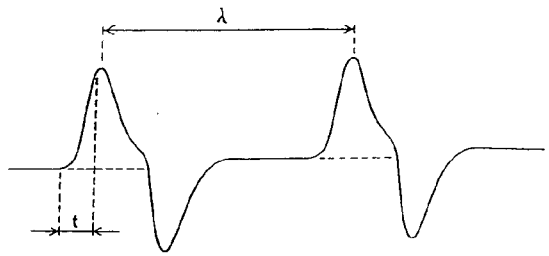

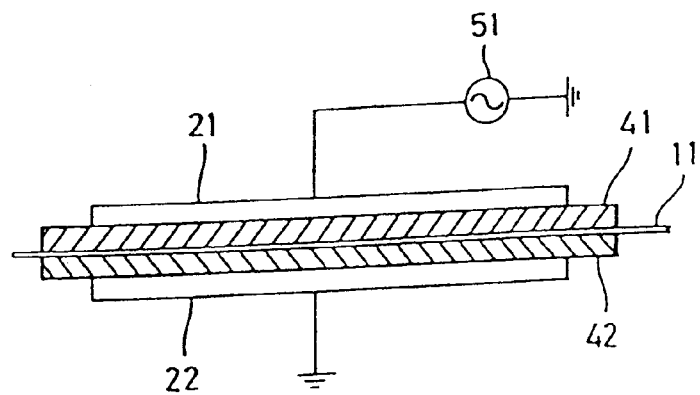
FIG.3
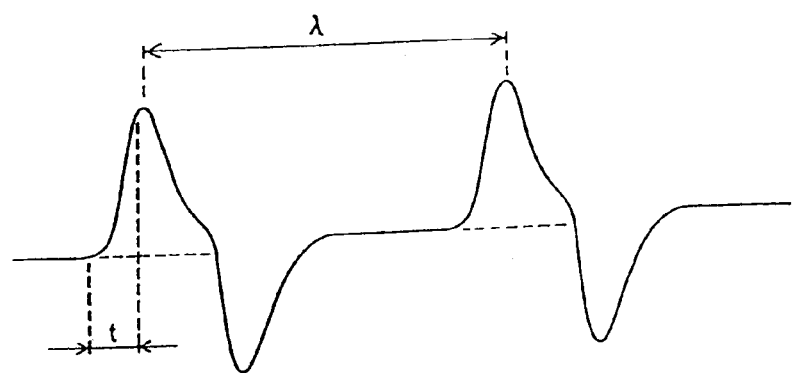
FIG.4
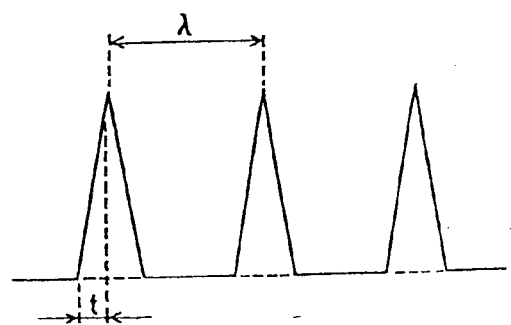

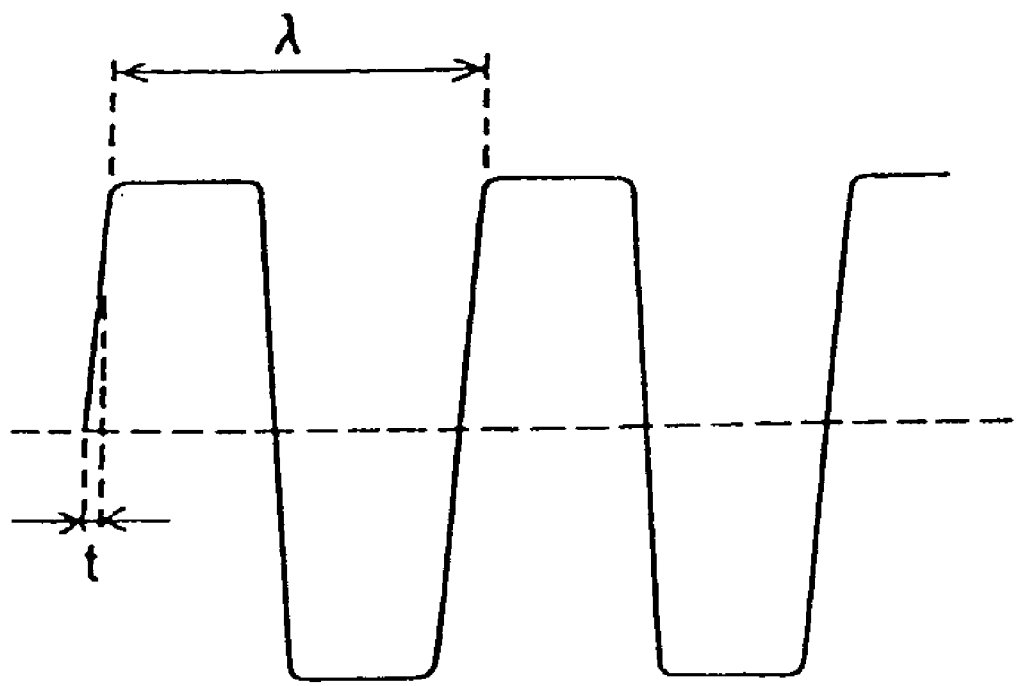

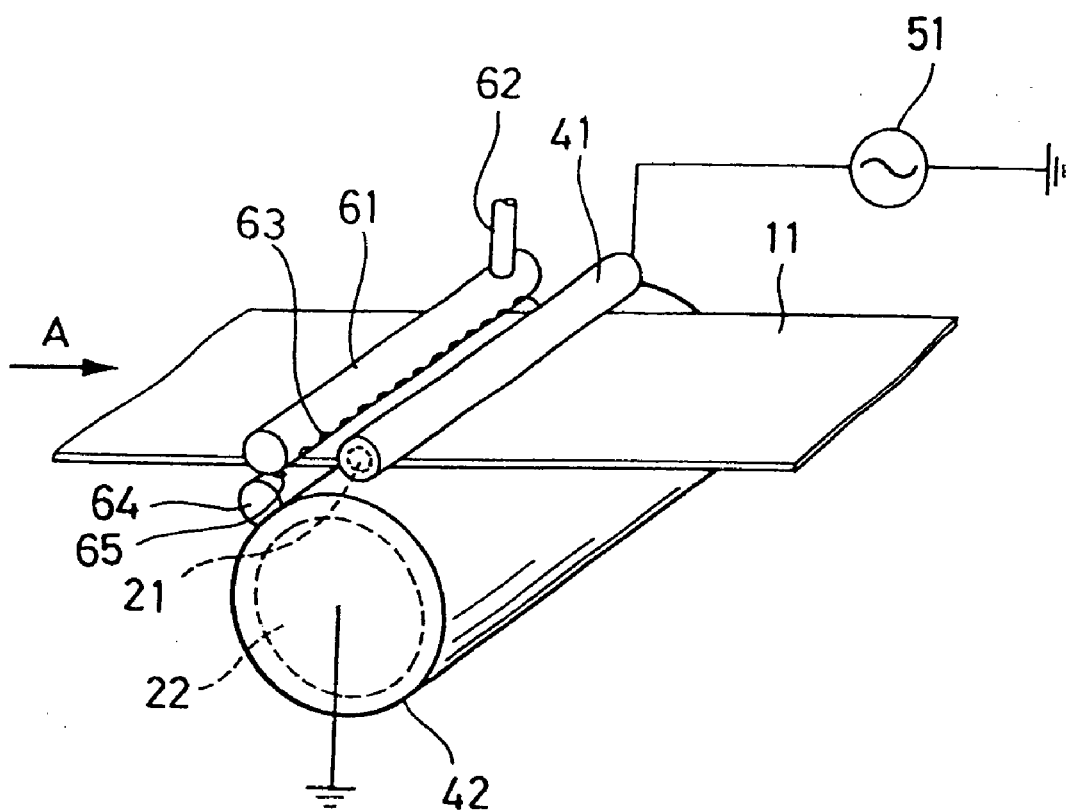

What is claimed is:

1. A process for introducing a sulfur containing atomic group onto at least a part of outer-inner surfaces of a porous article comprising the steps of:

placing said porous article between a pair of electrodes which are located opposite to each other, at least one of said electrodes carrying a dielectric layer on a surface facing the other electrode; and applying a repeating pulse voltage having a rising time of 0.2 microseconds or less between said electrodes in the presence of 10% by volume or more of a gas of a sulfur containing compound, based on a total volume of a surface-treating gas, under atmospheric pressure to thereby cause a discharge.

2. The process of claim 1, wherein the porous article is a non-woven fabric.

3. A process for introducing a sulfur containing atomic group onto at least a part of outer-inner surfaces of a porous article, comprising the steps of:

placing said porous article between a pair of electrodes which are located opposite to each other, at least one of said electrodes carrying a dielectric layer on a surface facing the other electrode; and applying a repeating pulse voltage having a rising time of 0.2 microseconds or less between said electrodes in the presence of a gas of a sulfur containing compound and an oxygen gas under atmospheric pressure to thereby cause a discharge and introduce the sulfur containing atomic group onto said surfaces.

4. The process according to claim 3, wherein said gas of said sulfur containing compound is present at an amount of 10% by volume or more, based on a total volume of a surface-treating gas.

5. The process of claim 3, wherein the porous article is a non-woven fabric.

* * * * *

UNITED STATES PATENT AND TRADEMARK OFFICE
CERTIFICATE OF CORRECTION

PATENT NO.      : 6,616,988 B1
DATED           : September 9, 2003
INVENTOR(S)     : Yasuski Takeuchi It is certified that error appears in the above-identified patent and that said Letters Patent is hereby corrected as shown below:

Title page,
Item [*] Notice, insert the following: -- Subject to any disclaimer, the term of this patent is extended or adjusted under 35 U.S.C. 154(b) by 147 days. --

Drawings,
The title page should be deleted to appear as per attached page.
The sheets of drawings consisting of figures 1-6 should be deleted to appear as per attached figures 1-6.

Signed and Sealed this

Twenty-fourth Day of August, 2004

JON W. DUDAS
*Director of the United States Patent and Trademark Office*

(12) United States Patent
Takeuchi et al.

(10) Patent No.: US 6,616,988 B1
(45) Date of Patent: Sep. 9, 2003

(54) SULFUR CONTAINING ATOMIC GROUP INTRODUCED POROUS ARTICLE, PROCESS FOR INTRODUCING A SULFUR CONTAINING ATOMIC GROUP ONTO THE OUTER-INNER SURFACES OF A POROUS ARTICLE, AND A BATTERY SEPARATOR

(75) Inventors: Yasushi Takeuchi, Ibaraki (JP); Masaaki Kawabe, Ibaraki (JP); Hiroaki Yamazaki, Ibaraki (JP); Masashi Kaneko, Ibaraki (JP); Genya Anan, Ibaraki (JP); Kazuya Sato, Ibaraki (JP)

(73) Assignee: Japan Vilene Company, Ltd., Tokyo (JP)

( * ) Notice: Subject to any disclaimer, the term of this patent is extended or adjusted under 35 U.S.C. 154(b) by 0 days.

(21) Appl. No.: 09/694,446

(22) Filed: Oct. 23, 2000

Related U.S. Application Data

(62) Division of application No. 09/255,661, filed on Feb. 22, 1999, now Pat. No. 6,171,708.

(30) Foreign Application Priority Data

Feb. 23, 1998 (JP) .......................................... 10-057498

(51) Int. Cl.$^7$ ................................................. H05H 1/46
(52) U.S. Cl. ........................ 427/596; 427/535; 427/538
(58) Field of Search ............................. 427/569, 535, 427/538

(56) References Cited

U.S. PATENT DOCUMENTS

| | | | |
|---|---|---|---|
| 3,255,099 A | * | 6/1966 | Wolinski |
| 4,765,860 A | * | 8/1988 | Ueno et al. ................. 427/491 |
| 4,929,319 A | * | 5/1990 | Dinter et al. |
| 5,585,147 A | * | 12/1996 | Ogawa et al. ............. 427/535 |
| 5,843,789 A | * | 12/1998 | Nomura et al. ............. 427/488 |
| 5,895,558 A | * | 4/1999 | Spence ....................... 427/569 |

* cited by examiner

*Primary Examiner*—Marianne Padgett
(74) *Attorney, Agent, or Firm*—Darby & Darby

(57) ABSTRACT

A porous article wherein a sulfur containing atomic group is introduced onto at least a part of outer-inner surfaces of the article, a ratio (S/C) of the number of sulfur atoms (S) to the number of carbon atoms (C) on the surface onto which the sulfur containing atomic group is introduced is $7 \times 10^{-4}$ or more, a ratio (O/C) of the number of oxygen atoms (O) to the number of carbon atoms (C) on the surface onto which the sulfur containing atomic group is introduced is 0.2 or more, and the ratio (S/C) and the ratio (O/C) are determined by means of an X-ray photoelectron spectrophotometer is disclosed.

5 Claims, 4 Drawing Sheets (3 of 4 Drawing Sheet(s) Filed in Color)